(12) United States Patent
Lv et al.

(10) Patent No.: US 7,938,012 B2
(45) Date of Patent: May 10, 2011

(54) SMART COAT FOR DAMAGE DETECTION INFORMATION, DETECTING DEVICE AND DAMAGE DETECTING METHOD USING SAID COATING

(75) Inventors: Zhigang Lv, Beijing (CN); Mabao Liu, Shaanxi Province (CN); Yanjie Qi, Shaanxi Province (CN); Wenzhen Zhao, Shaanxi Province (CN); Youmin Xi, Shaanxi Province (CN)

(73) Assignee: Shaoxing Jinggong Equipment Monitoring Technology Co., Ltd., Zhejiang Province ( * ) Notice: Subject to any disclaimer, the term of this patent is extended or adjusted under 35 U.S.C. 154(b) by 202 days.

(21) Appl. No.: 12/441,002

(22) PCT Filed: Sep. 12, 2007

(86) PCT No.: PCT/CN2007/002701
§ 371 (c)(1),
(2), (4) Date: Mar. 12, 2009

(87) PCT Pub. No.: WO2008/043250
PCT Pub. Date: Apr. 17, 2008

(65) Prior Publication Data
US 2010/0005895 A1    Jan. 14, 2010

(30) Foreign Application Priority Data
Sep. 12, 2006    (CN) .......................... 2006 1 0104559

(51) Int. Cl.
*G01B 7/16*    (2006.01)
(52) U.S. Cl. .......................................... 73/776; 73/777

(58) Field of Classification Search ............. 73/760–777
See application file for complete search history.

(56) References Cited

U.S. PATENT DOCUMENTS

| | | | | |
|---|---|---|---|---|
| 4,448,837 A * | 5/1984 | Ikeda et al. | ................... | 428/215 |
| 4,935,699 A * | 6/1990 | Boenning | ..................... | 324/555 |
| 5,298,708 A * | 3/1994 | Babu et al. | ..................... | 219/728 |
| 5,997,996 A * | 12/1999 | Tamura | ........................ | 428/209 |
| 6,079,277 A | 6/2000 | Chung | ............................ | 73/774 |
| 6,276,214 B1 | 8/2001 | Kimura et al. | .................. | 73/795 |
| 6,693,441 B2 * | 2/2004 | Lane et al. | ..................... | 324/662 |
| 6,986,287 B1 * | 1/2006 | Dorfman | ......................... | 73/776 |
| 7,032,457 B1 | 4/2006 | Dorfman | ......................... | 73/762 |
| 7,244,500 B2 * | 7/2007 | Watts et al. | .................... | 428/408 |
| 7,260,999 B2 * | 8/2007 | Divigalpitiya et al. | ......... | 73/774 |
| 2003/0102874 A1 * | 6/2003 | Lane et al. | ..................... | 324/662 |

FOREIGN PATENT DOCUMENTS

| | | |
|---|---|---|
| CN | 200610104559.4 | 9/2006 |
| CN | 1928539 | 3/2007 |
| WO | WO 2006/125253 | 11/2006 |

OTHER PUBLICATIONS

International Search Report and Written Opinion from PCT/CN2007/002701, dated Dec. 20, 2007.

* cited by examiner

*Primary Examiner* — Max Noori
(74) *Attorney, Agent, or Firm* — Westman, Champlin & Kelly, P.A.

(57) ABSTRACT

A smart coat with damage following feature for damage detection information, a detecting device and a damage detecting method using said smart coat, the smart coat could be set on a subject body and comprises a sensing layer, said sensing layer is composed of electrically-conductive material and has a thickness from 10 nanometers to 100 micrometers.

23 Claims, 4 Drawing Sheets

SMART COAT FOR DAMAGE DETECTION INFORMATION, DETECTING DEVICE AND DAMAGE DETECTING METHOD USING SAID COATING

CROSS-REFERENCE TO RELATED APPLICATION

This Application is a Section 371 National Stage Application of International Application No. PCT/CN2007/002701, filed Sep. 12, 2007, published in Chinese, the content of which is hereby incorporated by reference in its entirety.

FIELD OF INVENTION

The present invention relates to a damage monitoring device for materials and mechanical structures, more particular, to a damage detection information smart coat with damage following feature. The present invention further relates to a detecting device for detecting damage information for a body of a subject member, as well as a damage detecting method for damage detection information of the subject body.

BACKGROUND OF INVENTION

Presently, a typical damage detection apparatus for materials and mechanical structures primarily comprises a vortex damage detector, X-ray damage detector, magnetic crack detector, acoustic emission structure damage monitoring device, stress-strain meter and so on. Some of such devices only can be used after a damage occurs, and usually need to be install to the materials to be detected or the disassembled parts of the mechanical structure and they are hard to be used for long process monitoring; some of such devices although can be used for process monitoring, they are easily impacted by environmental signals and have a lower reliability, also, they are hard to be used to monitor the damage degree for an internal sealed structure or a complex structure.

SUMMARY OF INVENTION

In view of the above, the present invention is made to overcome one or more aspects of the shortages appeared in the above prior arts. Accordingly, an object of the present invention is to provide a damage detection information smart coat with damage following feature, which employs a "sensitive periphery" (smart coat) with damage following feature to directly present the damage degree of the body structure without disassembling the body structure, so it can be used for a part difficult to be detected and for a real time monitoring. Also, it is easy to use, and it has good reliability, satisfactory detection accuracy and an excellent applicability.

According to one aspect of the present invention, there is provided a smart coat for damage detection information, the smart coat may be provided on the subject body and comprises a sensing layer, which is composed of electrically-conductive material and has a thickness between 10 nanometers to 100 micrometers.

In this embodiment, the electrically-conductive material comprises electrically-conductive particles and a modifier, wherein the "modifier" is mainly used for improving the bond between the electrically-conductive particles and a driving layer or the body to be monitored, and allows the sensing layer to have a proper mechanical capability so as to present the damage following feature.

In one embodiment, the sensing layer may have a thickness from 100 nanometers to 100 micrometers.

Preferably, the sensing layer may have a thickness from 5 micrometer to 20 micrometer.

In one embodiment, the modifier may comprise at least one of activating agent, wetting agent and catalytic agent. The activating agent is mainly used for increasing the surface activity, which may comprises, for example, palladium chloride, sodium stannate and the like; the wetting agent is mainly used for reducing the surface tension, which may comprises, for example, sodium dodecanesulphonate and the like; the catalytic agent is mainly used for reducing reaction time, which may comprises, for example, silver chloride and the like.

In one embodiment, the subject body is made of electrically-conductive material.

In above embodiment, a driving layer is provided between the sensing layer and the subject body, and is divided into an organic material driving layer and an inorganic material driving layer. The inorganic material driving layer is composed of electrically-nonconductive inorganic material such as ceramic material, inorganic mineral fines, and modifier, the composition of the modifier may be the same as or different from that of the sensing layer. The organic material driving layer is formed of electrically-nonconductive organic material such as zinc chromate primer and an additive agent such as $ZrO_2$, $Al_2O_3$.

In addition, the driving layer is solidified to integrate with the subject body and the sensing layer. The driving layer has a thickness from 1 micrometer to 200 micrometers.

In one embodiment, a protective layer made of electrically-nonconductive material is provided on an outside of the sensing layer. The electrically-nonconductive material forming the protective layer may comprise paint, or ceramic, or sealant, wherein the paints may comprise polyurethane paint, fluorocarbon paint, epoxy ester paint and the like.

According to another aspect of the present invention, there is provided a detecting device for detecting the damage detection information, which comprises a smart coat which may be disposed on an subject body, the smart coat comprises a sensing layer, wherein the sensing layer is composed of electrically-conductive material; and a detecting circuit connected to both ends of the sensing layer for detecting electrical parameter of the smart coat.

In such detecting device, the sensing layer further comprises two working electrodes provided at both ends thereof; said detecting circuit is connected to such two working electrodes.

In one embodiment of the detecting device, the sensing layer may have a thickness from 10 nanometers to 100 micrometers. Preferably, the thickness of the sensing layer may be from 100 nanometers to 100 micrometers. More preferably, the thickness of the sensing layer may be from 5 micrometers to 20 micrometers.

In one embodiment, the body is made of electrically-conductive material.

The above detecting device further comprise a driving layer provided between the sensing layer and the subject body, which has an organic material driving layer or an inorganic material driving layer. The inorganic material driving layer is composed of electrically-nonconductive inorganic material. The organic material driving layer is formed of electrically-nonconductive organic material.

In above detecting device, the driving layer is solidified to integrate with the subject body and the sensing layer. The driving layer has a thickness from 1 micrometer to 200 micrometers.

The above detecting device further comprises a protective layer provided on an outside of the sensing layer. The protective layer is made of electrically-nonconductive material.

In one embodiment, the detecting circuit further comprises a cyclic detection device, which periodically detects the electrical parameters of the smart coat in a predetermined period.

In the above detecting device, the detecting circuit further comprises an alarm device, when the electrical parameter detected by the detecting device exceeds a predetermined limit value, the alarm device outputs alerting signals.

In the above detecting device, the alarm device further comprises a display; said alerting signals are outputted and displayed on the display.

In the above detecting device, the electrical parameter comprises at least one of resistance, conductance, current and voltage.

According to another aspect of the present invention, there is provided a damage detecting method for detecting the damage detection information of the subject body, comprises the steps of:

providing a smart coat, the smart coat comprising a sensing layer composed of electrically-conductive material; and providing a detecting circuit, which being connected to both ends of the sensing layer for detecting electrical parameter of the smart coat; and in response to a variation of the detected electrical parameter to determine the damage detection information of the subject body.

The above detecting method further comprises the step of providing working electrodes at both end of the sensing layer, wherein two ends of the detecting circuit are connected to said working electrodes.

In above detecting method, the step of determining the damage detection information of the subject body comprises:

detecting the electrical parameter of the smart coat by the detecting circuit;

comparing the value of the detected electrical parameter with that of the initial electrical parameter; and when the difference between the values of detected electrical parameter and the initial electrical parameter exceeds a predetermined range, existence of a damage of the subject body is determined.

In one embodiment, the detecting circuit further comprises an alarm device, when the value of the electrical parameter detected by the detecting device exceeds a predetermined limit, the alarm device outputs an alerting signal.

In one embodiment, the detecting circuit performs cyclic detection. During the operation of such cyclic detection, the detecting circuit detects the electrical parameter of the smart coat in a predetermined cyclic detection period.

The above detecting method further comprises the step of storing the detected electrical parameter during the first cyclic detection as the initial electrical data into a storage; when the difference between the current electrical parameter detected during the current cyclic detection and the initial electrical data exceeds a predetermined range, it is determined that the damage exists.

In one embodiment, the detecting circuit further comprises an alarm device. When the current electrical parameter detected by the detecting device during the cyclic detection exceeds a predetermined limit, the alarm device outputs an alerting signal.

In one embodiment, the subject body comprises two opposite surfaces, the smart coat is provided on at least one of the two surfaces. In another word, the information smart coat can be arranged in double sides or single side according to the requirement of monitoring.

In one embodiment, the sensor and the subject body are solidified to be integrated.

Compared with the prior art, the present invention has following advantages and effects:

1. The present invention is able to directly report the damage grade of the body structure by using a sensitive periphery with damage following feature, that is, the smart coat, and to monitor in real time whether a crack occurs in the structure according to the requirement. If the crack occurs in the structure, the present invention also can report the size of the crack and send the alarm signal at a corresponding level according to the requirement. Compared with the conventional non-damage detection technique, the present invention has significant advantages such as: being unnecessary to disassemble the structure, capable of being used on a portion difficulty to be detected, being unnecessary to specify the possible extending direction of the crack, and monitoring in real time. Also, compared with the acoustic emission monitoring technique, the present invention is more simple and convenient, it has a better reliability and it is better for the monitoring used in the practical structure. Furthermore, compared with the stress-strain monitoring technique, the present invention is more accurate and has a better applicability.

2. The damage following monitoring system for the damage condition of an aircraft configuration based on the present invention is able to extremely ensure the flying safety of the aircraft and extend the life span thereof. Furthermore, the present invention can be used into any other large-scale or important equipment of which a fracture failure is possible to occur, for example, a submarine, a warship, a power station, a bridge, a large-scale round tank, an oil pipeline, an oceanographic platform, a shuttle craft, a camion, a mining machine and so on. By the monitoring system in the present invention, it is able to avoid happening of serious accident, improve the reliability, greatly extend the actual life span of various equipments, and reduce the maintaining cost.

BRIEF DESCRIPTION OF THE DRAWING

FIG. 5 is a diagram showing a configuration and an operational principle of an exemplary cyclic detection device according to the present invention, wherein

wherein,
1—a protective layer
2—a sensing layer
3—a driving layer
4—a subject body
5—a smart coat (sensitive periphery)
6—hole

DETAILED DESCRIPTION OF THE PREFERRED EMBODIMENTS

Embodiments of the present invention will be described hereinafter in detail with reference to the attached drawings by way of examples, wherein the like reference numerals refer to the like elements throughout the specification. The description of the embodiments of the present invention is intended to explain the general inventive concept of the present invention and should not be construed as a limitation of the invention.

The embodiments of the present invention employ a damage detecting sensitive periphery (smart coat) with a damage following feature. The definition of "damage following feature" is: the sensitive periphery (the smart coat) has a following feature related with any types of damaging behavior occurred in a subject body when it is closely integrated with the subject body, that is, the damaging behavior of the body can be presented by the damaging behavior of the smart coat, which can be specifically found in: 1) if a crack occurs in the subject body, a crack occurs in the smart coat; 2) if there is no crack occurred in the subject body, then there is no crack occurred in the smart coat; 3) if the crack produced in the subject body has been expanded, the crack produced in the smart coat is also accordingly expanded; 4) if the crack produced in the subject body is not expanded, the corresponding crack produced in the smart coat is not expanded either.

The smart coat can be formed in four configurations: 1) being singly formed of a sensing layer; 2) being composite of a driving layer and a sensing layer; 3) being composite of a sensing layer and a protective layer; 4) being composite of a driving layer, a sensing layer and a protective layer.

When the smart coat is formed of a single sensing layer, or composite of a driving layer and a sensing layer, or composite of a sensing layer and a protective layer, in one embodiment, the sensing layer is solidified (fused) to be integrated with the subject body, so that an excellent body damage following feature of the smart coat is ensured.

The driving layer may be divided into an organic material driving layer and an inorganic material driving layer, wherein the inorganic material driving layer is composed of such as ceramic material, inorganic mineral fines, and modifier etc; and the organic material driving layer is composed of such as zinc chromate primer, additive agent, and the like. The driving layer is solidified (fused) to integrate with the subject body and the sensing layer so as to have an excellent body damage following feature: in which when a crack is formed in the subject body material, a crack is formed in the driving layer, thereby driving the sensing layer so that a crack is produced in the sensing layer; when the crack in the body is expanded, the crack in the driving layer is also expanded, thereby driving the sensing layer so that the crack in the sensing layer is also expanded. Another major function of the driving layer is to isolate the body (according to the requirement) from the sensing layer so that the electrical parameter information of the sensing layer is not interfered by the base. The thickness of the driving layer can be varied from several micrometers to several tens of micrometers and even to hundreds of micrometers according to the requirement, for example, from 1 micrometer to 200 micrometers.

The sensing layer is composed of electrically-conductive particles, modifier and so on. Under the action of the driving layer, once the crack is produced and expanded, the electrical parameter (e.g. resistance, conductance, current, or voltage) of the sensing layer will have significant and regular change, such change information of the electrical parameter can be inputted into an information collecting device through a damage characterizing parameter monitor, therefore, the sensing layer is an electrically-conductive material with crack following feature and the thickness thereof can be selected from tens of nanometers to tens of micrometers according to the requirement.

The protective layer is primarily used for protecting the smart coat, in particular, protecting the sensing layer and isolating according to requirement. The thickness of the protective layer is not quite limited, and can be determined according to the actual requirement.

Figure 1:
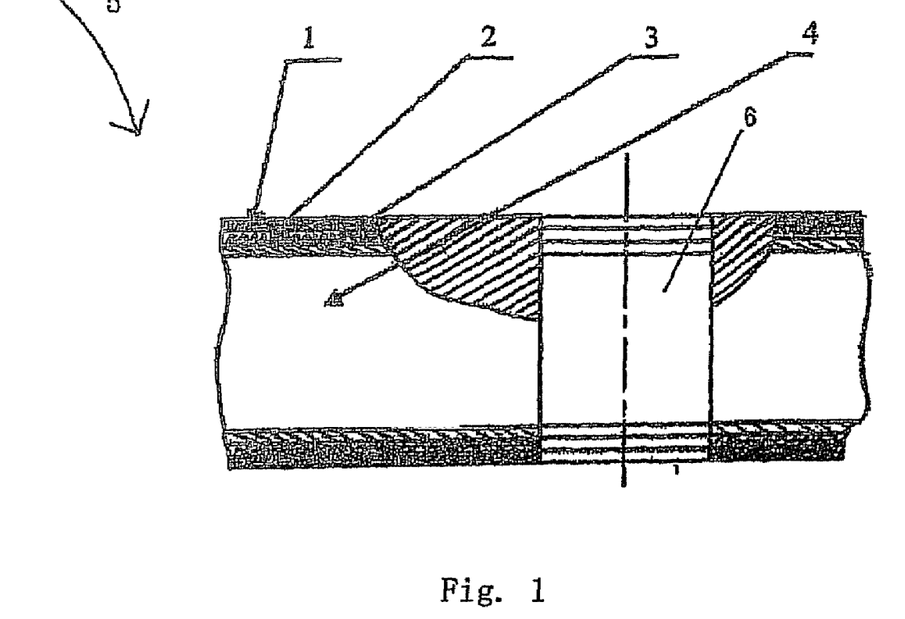
FIG. 1 is a structural schematic view of a smart coat of the present invention.

Refer to FIG. 1, FIG. 1 shows the fourth one of four types of sensitive periphery, i.e., information smart coat 5, comprising a sensing layer 2 disposed to the subject body 4, the sensing layer is formed of an electrically-conductive substances, such electrically-conductive substances may comprise electrically-conductive particles and modifier.

In one embodiment, the sensing layer 2 can be made of electrical conductor such as Cu, Ni, Ag, Au, or graphite powder or the like. In another word, in above embodiment, the electrically-conductive particles may comprise electrically-conductive particles such as Cu, Ni, Ag, Au, or graphite powder. In particular, the electrically-conductive particles may have microcrystalline cupper.

The main function of the modifier is to allow the smart coat to have the damage following feature and to eliminate the influence on the electrical parameter of the sensing layer caused by the environmental temperature and the like. The modifier may comprise at least one of activating agent, wetting agent and catalytic agent. The activating agent is mainly used for increasing the surface activity, and may comprise palladium chloride, sodium stannate and the like; the wetting agent is mainly used for reducing the surface tension, and may comprise sodium dodecanesulphonate and the like; the catalytic agent is mainly used for reducing reaction time, and may comprise silver chloride and the like.

Usually, the thickness of the sensing layer may be from tens of nanometers to tens of micrometers. In one embodiment the sensing layer may have a thickness from 10 nanometers to 100 micrometers. Preferably, the thickness of the sensing layer may be from 100 nanometers to 100 micrometers. More preferably, the thickness of the sensing layer may be from 5 micrometers to 20 micrometers.

In one embodiment, a driving layer 3 is provided between the sensing layer 2 and the subject body 4. The function of the driving layer 3 is to transfer the damage of the mechanical body 4 to the sensing layer 2, and when it is necessary, for example, when the subject body 4 is a conductor, the subject body 4 is isolated from the sensing layer 2, so that the electrical parameter information of the sensing layer 2 is not interfered by the body 4.

The driving layer 3 may be divided to an organic material driving layer and an inorganic material driving layer. The inorganic material driving layer is composed of ceramic material, inorganic mineral fines, and modifier. The organic material driving layer is formed of zinc chromate primer and additive agent; the additive agent may be, for example, $ZrO_2$, $Al_2O_3$, and is able to improve the mechanical performance of the driving layer.

In one embodiment, the driving layer 3 may be formed of epoxy ester zinc chromate primer H06-2 or H06-3 and the like. The modifier used in the driving layer may be the same as or different from that in the sensing layer, the primary function of the modifier is to allow the smart coat to have the damage following feature and to eliminate the influence on the electrical parameter of the sensing layer caused by the environmental temperature and the like. For example, the modifier in above driving layer may comprise palladium chloride, dimethylbenzene-butanol and the like.

In one embodiment, the driving layer 3 is solidified to integrate with the subject body 4 and the sensing layer 2. In one embodiment, the driving layer 3 has a thickness from few micrometers to hundreds of micrometers. In one embodiment, the thickness of the driving layer is from 1 micrometer to 200 micrometers.

Refer to FIG. 1, a protective layer 1 is provided on an outside of the sensing layer 2. The protective layer 1 mainly functions to protect the sensing layer and the driving layer 3 provided therein from the outside damage and the unfavorable influence of the environment. In one embodiment, the protective layer 1 may be made of variety of paints, for example, polyurethane paint, fluorocarbon paint, epoxy ester paint and the like, or ceramic or sealant.

The materials of the driving layer 3, and the sensing layer 2 are solidified to be integrated with the subject body 1 material, and may be distributed as a smart micro-driving surface layer sensing network at the critical portion or the danger portion (i.e., a high stress area in which crack trends to occur) of the member to be monitored, and may become a material system having self adaptability for the accumulative damages caused by both loads and environment to monitor the damage degree of the member. The fundamental principles are as followed: after the geometry and the thickness of the applied smart coat are determined, a resistance is formed, in which the value of the resistance is mainly changed with the change of the surface crack of the body to be monitored, thus, a crack is produced in the smart coat when a crack occurs in the body to be monitored. Here, the smart coat can be served as a resistant sensor sensitive to the crack of the body to be monitored, after the relationship between the quantitative change of the crack and that of the sensor resistance are found through theoretical calculation and experimental analysis, the crack conditions at the monitored point can be indirectly found out by measuring the resistance value of the measured point (it may need to consider the temperature compensation according to the requirement).

FIG. 1 shows a schematic view of a monitoring state of the smart coat 5. Refer to FIG. 1, the subject body 4 has an upper surface and a lower surface opposite to each other, a hole 6 is provided in the subject body 4. As shown in FIG. 1, the smart coat 5 is provided on the two opposite surfaces around the hole 6 of the subject body 4. In other words, the smart coat 5 can be arranged on both sides of the body for double side monitoring; apparently, the smart coat 5 can be disposed on a single side for single side monitoring.

EXAMPLE 1

For a member to be connected to another member by a screw (in the member the diameter of a threaded hole is 15 mm), microcrystalline cupper is employed as electrically-conductive particles, under the state that the sensing layer of the sensitive periphery (information smart coat) has a width of 1.2 mm and a thickness of 15 μm, if the alarm value of the increment of the resistance is set to 0.06 ohm, the monitored crack length of the subject body is about 0.6-0.8 mm.

EXAMPLE 2

For a member to be connected to another member by a rivet (in the member the diameter of a hole is 15 mm), microcrystalline cupper is employed as electrically-conductive particles, under the state that the sensing layer of the sensitive periphery (information smart coat) has a width of 1.2 mm and a thickness of 15 μm, if the alarm value of the increment of the resistance is set to 0.05 ohm, the monitored crack length of the subject body is about 0.5 mm.

EXAMPLE 3

For a member suffering in-plane bending, microcrystalline cupper is employed as electrically-conductive particles, under the state that the sensing layer of the sensitive periphery (information smart coat) has a width of 1.2 mm and a thickness of 15 μm, if the alarm value of the increment of the resistance is set to 0.06 ohm, the monitored crack length of the subject body is about 0.6-0.8 mm.

EXAMPLE 4

For a member suffering transverse bending, microcrystalline cupper is employed as the electrically-conductive particles, under the state that the sensing layer of the sensitive periphery (information smart coat) has a width of 1.2 mm and a thickness of 15 μm, if the alarm value of the increment of the resistance is set to 0.06 ohm, the monitored crack length of the subject body is about 0.5 mm.

Figure 2:
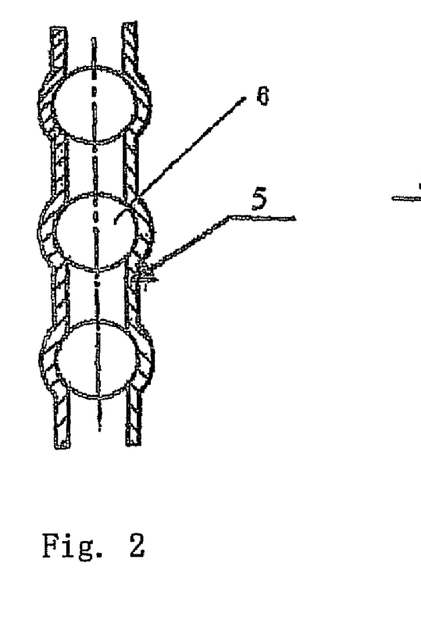
FIG. 2 is a schematic view of a sensing network of a smart driving surface layer.
Figure 3:
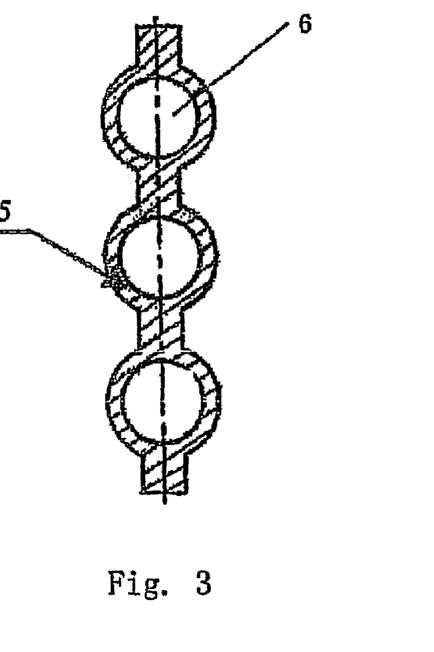
FIG. 3 is another schematic view of a sensing network of a smart driving surface layer.

Various smart surface layer sensing networks can be formed by the smart coat according to actual requirement of structure monitoring; FIGS. 2 and 3 show an example for monitoring the hole in the subject body. Refer to FIG. 2, for example, three holes 6 are provided in the subject body 4. Since the provision of holes 6, key and danger portions (i.e., the high stress area in which cracks is easy to occur) of the body to be monitored are formed at periphery of the holes 6. As shown in FIG. 2, the smart coat 5 is provided at both sides of the holes 6 (at left and right sides of the holes 6 shown in FIG. 6). In another smart surface layer sensing network, as shown in FIG. 3, the smart coat 5 is provided at the periphery of the holes 6 (the smart coat 5 surrounds the holes 6 in FIG. 3).

Figure 4:
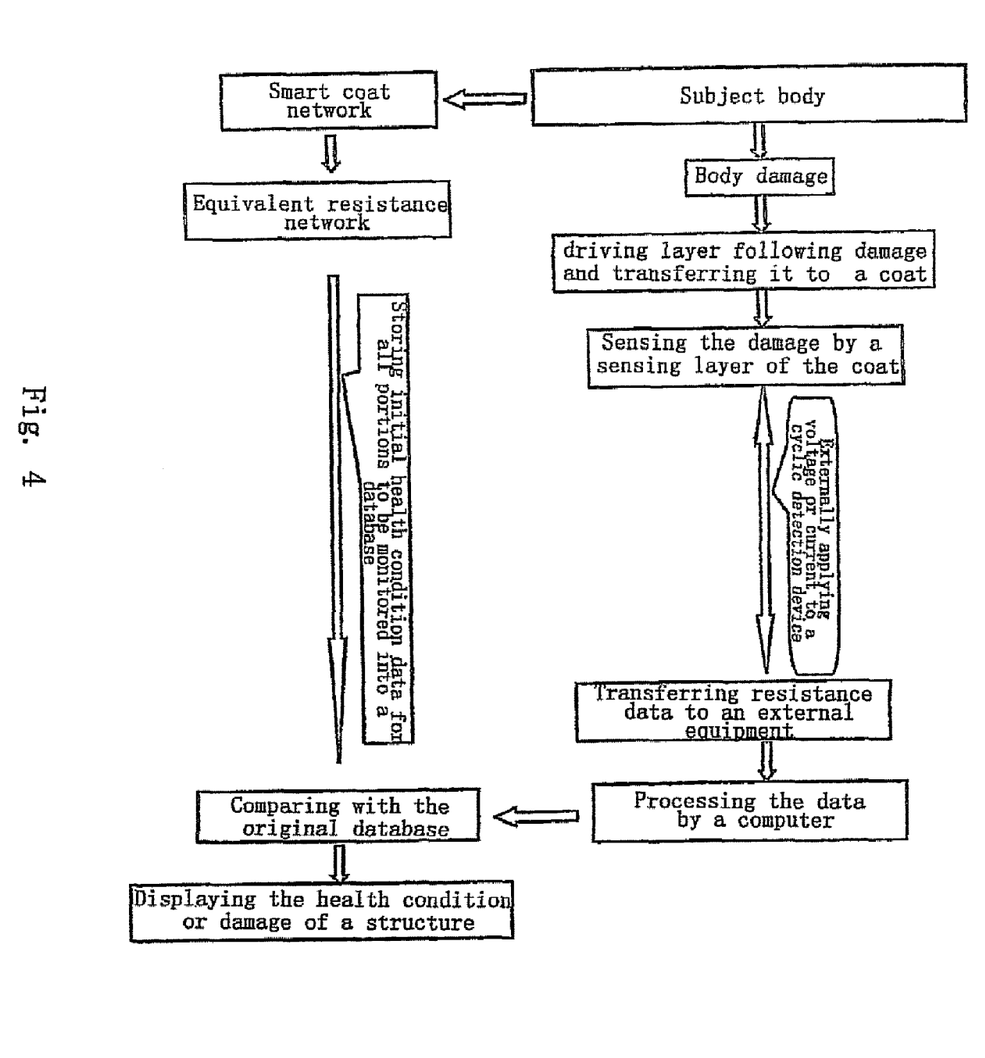
FIG. 4 is a schematic diagram showing an operation of a monitoring system for damage conditions of a structure.

Refer to FIG. 4, which shows the working schematic diagram of a monitoring system for the damage conditions of the body. Firstly, after the subject body is completed, the smart coat formed by the information smart coat is coated at structurally dangerous or complex portions of the subject body according to the features thereof. Thereby, a smart coat sensing network is formed by the smart coat coated on the subject body. And then, at least two working electrodes are provided at selected positions of the smart coat sensing network, and both ends of the detecting circuit and the smart coat sensing network are connected. The working electrodes can be formed in the manner of, for example, electrode posts formed at the edge portion of the smart coat. Apparently, the working electrodes can be formed in the manners of thin print circuit board and the like on both ends of the smart boat.

After the smart coat sensing network is connected to the two ends of the detecting circuit, above smart coat sensing network constitutes an equivalent resistance network. Here, the detecting circuit is applied with current or voltage, so all of electrical parameters (for example, resistance, conductance, current, voltage and the like) of the detected portion under the initial damage condition (including healthy condition without damage) are stored into an external device, for example, a storage, as initial electrical data to form an original database.

Next, if the subject body is damaged, since the sensitive periphery formed by the smart coats has damage following feature, the smart coat and the body have the same surface crack producing feature, and the same or relevant crack expanding feature. Accordingly, in response to such surface crack producing feature, the same or relevant surface crack expanding feature, the equivalent resistance network formed by the smart coat sensing network is correspondingly changed. Thus, the electrical parameters such as the resistance, the conductance, the current, the voltage detected by the detecting circuit are also changed. The electrical parameters detected by the detecting circuit are inputted into the external device, such as a storage device or memory, to form the current data. In one embodiment, the data is processed by a processor such as the computer, and the current data is compared with the initial data. If the difference between the detected current data and the initial data exceeds a predetermined range, it can be determined that the subject body is damaged. Furthermore, by monitoring the variable curve (increment curve) for the difference between the current data and the initial data, the expanding feature of the damage of the subject body can be judged. In on embodiment, the detecting circuit further comprises an alarm device. When the electrical parameters detected by the detecting device exceed a predetermined limit, the alarm device output an alerting signal. In one embodiment, above alerting signal can be visually displayed on a LCD display. Alternatively, above alerting signal also can be spread through sounds by a sound system.

In one embodiment, the detecting circuit is further provided with a cyclic detection device which allows the detecting circuit to perform cyclic detection periodically. Moreover, the cyclic detection device also may form a smart network system with a corresponding microprocessor, so that the whole system can be operated according to a cyclic detection instruction set by a system software. During the cyclic detection, the detecting circuit detects electrical parameters of the smart coat 5 at a predetermined cyclic detection period. Such cyclic detection period can be selected to have different length of time according to difference detection applications, for example, for those important equipments or facilities, such as aircraft, the cyclic detection period can be set to one period of departing and landing; for a ship, a large-scale oil tank, an oil pipeline, the cyclic detection period can be set to 10 seconds or few hours. The electrical parameters detected during the initial cyclic detection are stored in the storage as the initial electrical parameters. During the current cyclic detection, if the difference between the detected current electrical parameter and the initial electrical data exceeds a predetermined range, it is determined that the subject body is damaged. In one embodiment, the detecting circuit further comprises an alarm device. When the current electrical parameters detected by the detecting device during the cyclic detection exceed a predetermined limit, the alarm device outputs an alerting signal. Specifically, it may give an alarm by flashing the display and/or sending sounds.

Figure 5A:
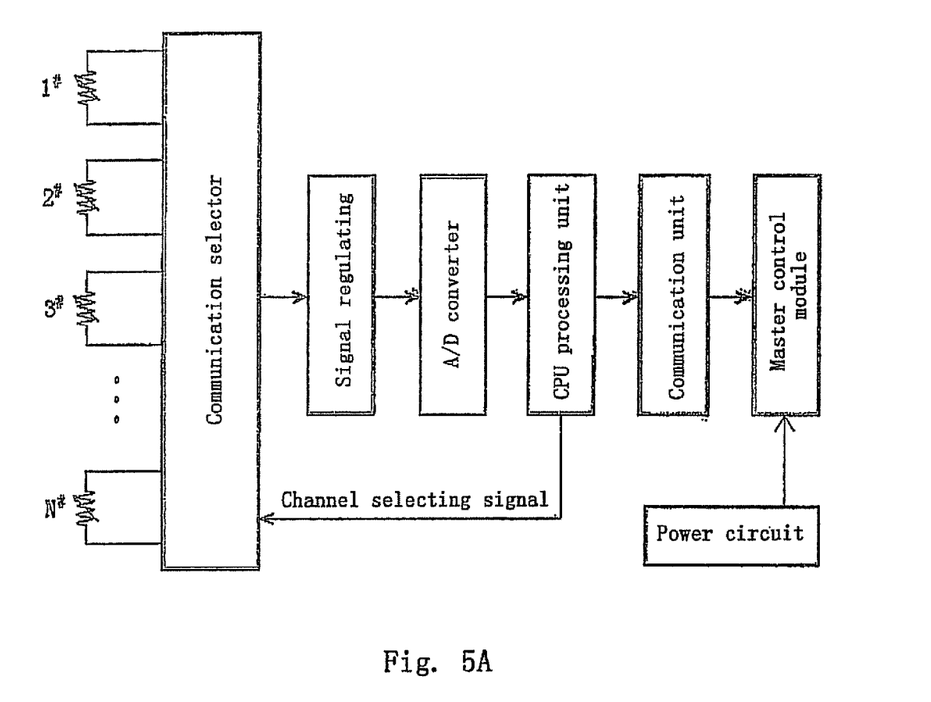
FIG. 5A is a schematic diagram of a multi-channel pre-submodule of the cyclic detection device.
Figure 5B:
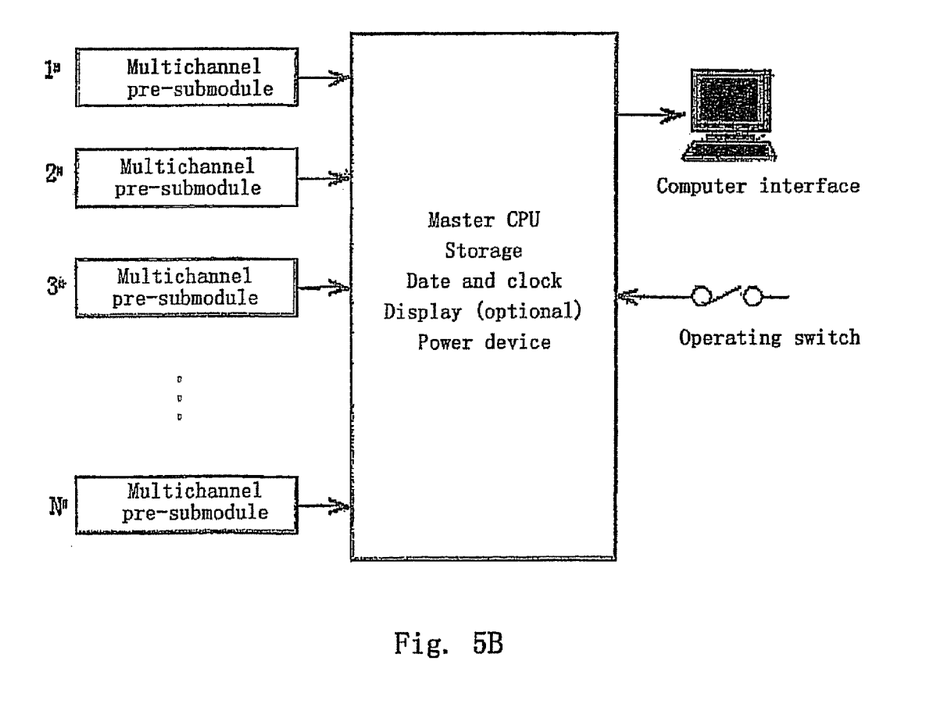
FIG. 5B is a system configuration schematic diagram of the exemplary cyclic detection device according to the present invention.

FIG. 5 is a diagram showing a constitutional structure and an operational principle of an exemplary cyclic detection device according to the present invention, wherein FIG. 5A is a schematic diagram of a multichannel pre-submodule of the exemplary cyclic detection device according to the present invention; FIG. 5B is a schematic diagram showing a configuration of a system including an exemplary cyclic detection device according to the present invention. Refer to FIG. 5B, an exemplary cyclic detection device according to the present invention is primarily formed by a multichannel pre-submodule and a master control module. As shown in the figure, the whole system may be constituted by a plurality of identical pre-submodules for measurement and one master control module. Apparently, theoretically, the number of the pre-submodules may be one. Above cyclic detection device has a function of multichannel resistance measurement. Firstly, an initial resistance value for every sensor is measured and saved as a reference value. Afterward, a measured value in every time is compared with the reference value to produce a difference, the health condition of the monitored point can be known by inspecting the difference. When the difference is greater than a set threshold value, a crack occurs. When the difference is infinite, it is indicated that the sensor has been broken, and the body crack has already exceeded the monitoring range of the smart coat.

Refer to FIG. 5B, the number of the sensor channels in which the cyclic detection device can perform the measurement may be varied from 1 to 1024 according to the actual requirement. When the sensors have a large number and are spread around, in order to reduce the length of wires for the smart coat on measured points, reduce interference, improve the accuracy of the measurement, as well as to reduce the total wiring and the job difficulty, the system employs distributed measuring method or wireless radiating and receiving method.

Each of pre-submodules for measurement can measure a plurality of sensor channels (typically, 8 or 16), and be arranged to be close to each set of sensors grouped by nearby sensors. The pre-submodules (refer to FIG. 5A) themselves may be micro monolithic computer system, which comprises a multiple sensor signal channel option switch, a signal regulating circuit, an A/D analog-to-digital converter, a central processing unit CPU, a digital communication circuit, a power circuit, and other auxiliary circuits. The pre-submodules for measurement circularly measure the resistance for each sensor in the form of time sharing according to the predetermined time period, and perform necessary processing for the data, and finally, send it to the master control module in the form of digital communication. Since the digital communication between each of the pre-submodules and the master control module is performed through only one cable (or through a wireless communication method), and it is not necessary for every analog signal of the sensor to connect to the master control module, the workload for wiring is extremely reduced, and at the same time, the measuring accuracy and the reliability are improved. The number of pre-submodules may be more or less depending on the number of the measured points. The volume of the system also can be as small as possible to facilitate the installation.

As shown in FIG. 5B, the master control module may comprise therein: a communication unit for sending and receiving the information and data to and from each submodule; a storage unit for storing all of operation parameters and data, wherein the storage unit may be different types of storage, for example, a flash memory, a ROM, a floppy disk drive, a hard disk drive and the like. In order to reliably record the data, the storage unit can be designed with double backup systems. The master control module may further comprise therein: a date and clock unit for recording the date and time or working hours when the sensor resistance is changed, the time information and the sensor resistance are simultaneously recorded in the storage unit. Through the date and clock unit, the CPU can control the detecting system to detect the electrical parameters of the smart coat in a predetermined cyclic detection period, for example, a resistance value.

Furthermore, the master control module may further comprise a human-computer interface. The data may be transferred to a computer to be processed through a computer interface, or a color LCD display with high luminance and wide operating temperature range and a thin-film push button are embedded in the master control module so that the working condition for the whole monitoring system can be displayed conveniently and visually. The resistance status for every channel sensor can be seen at any time, and can be displayed both in words and curves. The altering value of the resistance (equivalent to the altering value of the crack length) can be set so that every channel sensor can be monitored at any time. Once the altering value is reached, the display performs flash alarm and/or audible alarm is performed.

Furthermore, the master control module may also comprise a central processing unit CPU for managing the operation of each unit; and a power device for supplying the power to each module.

Figure 6:
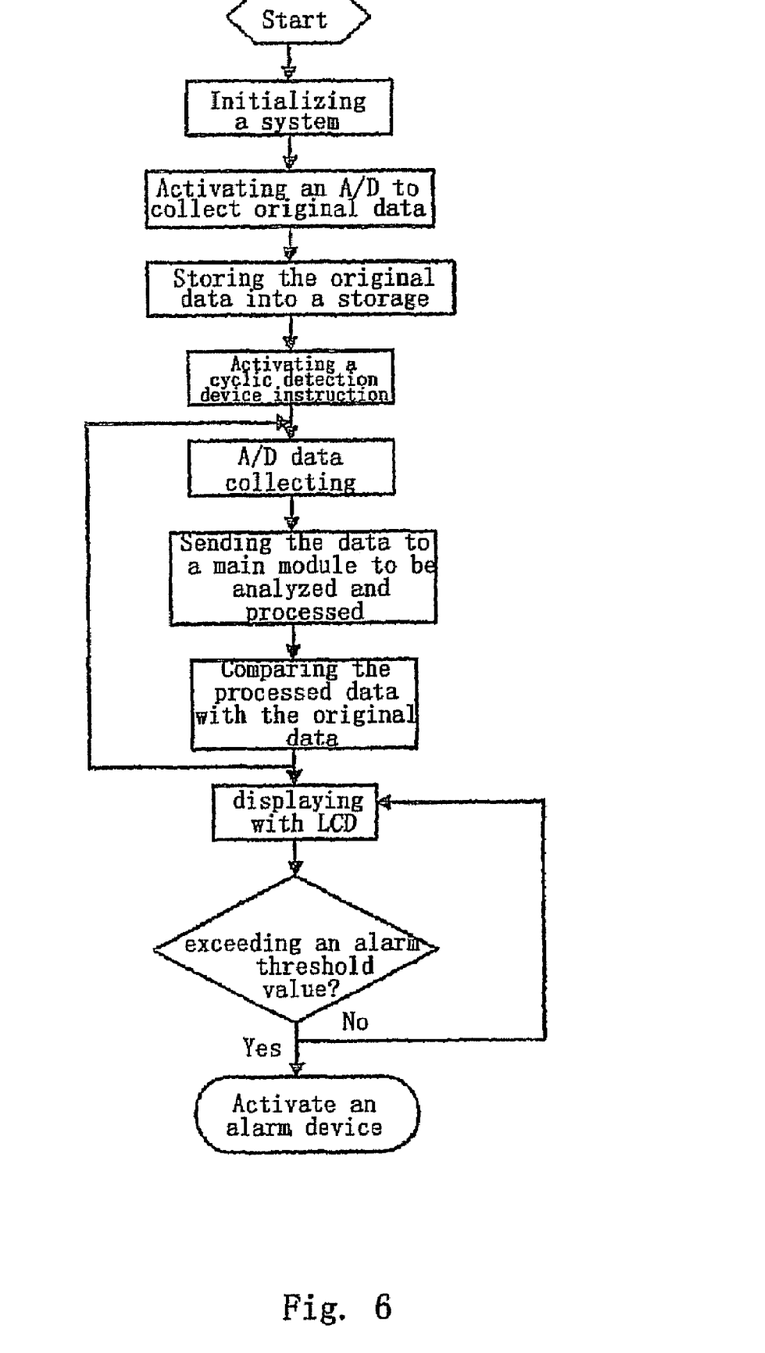
FIG. 6 is a primary working flow chart of a detecting system including a cyclic detection device according to the present invention.

Refer to FIG. 6, the working process of the whole detecting system having the cyclic detection device is shown in FIG. 6. Once activating the cyclic detection device, the cyclic detection device is externally applied with the current or voltage, the system comes into the working state after the system initializing. An original data, that is an initial damage condition of the structure, is collected for the first time and sent and stored into the storage device, such as a memory. And then, the cyclic detection system performs cyclic detection in accordance with a cyclic detection period set by a software. The A/D converter converts the electrical parameters, such as resistance information, sent from the sensing layer into a digital signal suitable for the processing of a master module digital signal processing (DSP) system as the current data. The current data is transferred to the DSP system to be analyzed and processed. The resistance increment or absolute resistance value for each monitored portion is displayed through a LCD display, and the variable curve of the resistance increment or that of the resistance corresponding to the resistance increment or absolute resistance value can be also visually displayed. When the difference between the current data and the original data is reached to a predetermined range, it is determined that the subject body is damaged. When the resistance increment of the monitored potion exceeds a predetermined alarm value, the alarm is given, for example, by the flashing of the LCD and/or sound.

The specific working processes of the detecting system having above cyclic detection device are:
(1): Start;
(2): Initializing the system;
(3): Activating the A/D to collect the original data;
(4): Storing the original data into the storage;
(5): Activating the cyclic detection device instruction;
(6): A/D data collecting;
(7): Sending the data to the master module to be analyzed and processed;
(8): Comparing the processed current data with the original data to judge whether the body or the corresponding structure is damaged, and at the same time, returning to repeat the A/D data collecting in accordance with next inspecting instruction;
(9): Displaying an increment variable graph of a difference between the current data and the original data on a LCD;
(10): Determining whether it exceeds the alarm limit? If YES, activating the alarm device; and returning to the previous step to continuously display the graph if it does exceed the alarm limit.

It needs to be noticed that several steps within above typical working process in the detecting system, for example, the steps of displaying on a LCD and activating the displaying are not necessary. The working process of the detecting system having above cyclic detection device can be regulated and the steps of the working process can be deleted.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A smart coat for damage detection information, said smart coat can be provided on a subject body, wherein the subject body is made of an electrically-conductive material, characterized in that the smart coat comprises a sensing layer, wherein the sensing layer is composed of an electrically-conductive material, and a thickness of the sensing layer is from 10 nanometers to 100 micrometers, the smart coat further comprises a driving layer provided between the sensing layer and the subject body, the driving layer is composed of an organic material driving layer or an inorganic material driving layer, the inorganic material driving layer is composed of an inorganic electrically-nonconductive material, the organic material driving layer is composed of an organic electrically-nonconductive material;

wherein said electrically-conductive material comprises electrically-conductive particles and a modifier, and the modifier comprises at least one of an activating agent, a wetting agent and a catalytic agent; and the inorganic electrically-nonconductive material forming the inorganic material driving layer comprises a ceramic material, inorganic mineral fines, and a modifier, the electrically-nonconductive organic material forming the organic material driving layer comprises a zinc chromate primer and an additive agent.

2. The smart coat for damage detection information as claimed in claim 1, characterized in that the thickness of the sensing layer is from 100 nanometers to 100 micrometers.

3. The smart coat for damage detection information as claimed in claim 2, characterized in that the thickness of the sensing layer is from 5 micrometers to 20 micrometers.

4. The smart coat for damage detection information as claimed in claim 1, characterized in that, the driving layer is solidified to integrate with the subject body and the sensing layer, and a thickness of the driving layer is from 1 micrometer to 200 micrometers.

5. The smart coat for damage detection information as claimed in claim 1, characterized in that the smart coat further comprises a protective layer provided on an outside of the sensing layer for protecting said sensing layer, said protective layer is made of an electrically-nonconductive material.

6. The smart coat for damage detection information as claimed in claim 5, characterized in that the electrically-nonconductive material forming the protective layer comprises a paint, or ceramic, or sealant, wherein the paint comprises a polyurethane paint, a fluorocarbon paint, and an epoxy ester paint.

7. A detecting device for detecting damage detection information, comprising:
a smart coat which can be provided on a subject body, said smart coat including a sensing layer formed by an electrically-conductive material and a thickness of the sensing layer is from 10 nanometers to 100 micrometers;
a detecting circuit connected to both ends of said sensing layer for detecting an electrical parameter of said smart coat,
wherein said electrically-conductive material comprises electrically-conductive particles and a modifier, and the modifier comprises at least one of an activating agent, a wetting agent and a catalytic agent; and
wherein the detecting circuit further comprises a cyclic detection device, which periodically detects the electrical parameter of the smart coat in a predetermined period.

8. The detecting device for detecting damage detection information as claimed in claim 7, characterized in that:
the sensing layer further comprises two working electrodes provided at two ends thereof, said detecting circuit is connected to said working electrodes.

9. The detecting device for detecting damage detection information as claimed in claim 7, characterized in that:
the thickness of the sensing layer is from 100 nanometers to 100 micrometers.

10. The detecting device for detecting damage detection information as claimed in claim 7, characterized in that:
the subject body is made of an electrically-conductive material.

11. The detecting device for detecting damage detection information as claimed in claim 10, characterized in that:
the detecting device further comprises a driving layer provided between the sensing layer and the subject body, the driving layer is composed of an organic material driving layer or an inorganic material driving layer, the inorganic material driving layer is composed of an inorganic electrically-nonconductive material, the organic material driving layer is composed of an organic electrically-nonconductive material.

12. The detecting device for detecting damage detection information as claimed in claim 11, characterized in that:
the driving layer is solidified to integrate with the subject body and the sensing layer, and a thickness of the driving layer is from 1 micrometer to 200 micrometers.

13. The detecting device for detecting damage detection information as claimed in claim 7, characterized in that the device further comprises:
a protective layer provided on an outside of the sensing layer for protecting said sensing layer, said protective layer is made of an electrically-nonconductive material.

14. The detecting device for detecting damage detection information as claimed in claim 7, characterized in that:
the detecting circuit further comprises an alarm device, when the electrical parameter detected by the detecting device exceeds a predetermined limit, the alarm device outputs alerting signals.

15. The detecting device for detecting damage detection information as claimed in claim 14, characterized in that:
the alarm device comprises a display; said alerting signals are outputted and displayed on the display.

16. The detecting device for detecting damage detection as claimed in claim 7, characterized in that said electrical parameter comprises at least one of resistance, conductance, current and voltage.

17. A damage detecting method for detecting damage detection information of a subject body, comprising the steps of:
providing a smart coat, said smart coat comprising a sensing layer made of an electrically-conductive material and a thickness of the sensing layer is from 10 nanometers to 100 micrometers;
providing working electrodes at both ends of said sensing layer;
providing a detecting circuit, said detecting circuit connected to both ends of said sensing layer for detecting an electrical parameter of the smart coat, wherein both ends of the detecting circuit are connected to said working electrodes; and
determining the damage detection information of the subject body in response to the variation of the detected electrical parameter,
wherein said electrically-conductive material comprises electrically-conductive particles and a modifier, and the modifier comprises at least one of an activating agent, a wetting agent and a catalytic agent; and
the step of determining the damage detection information of the subject body comprises:
detecting the electrical parameter of the smart coat through said detecting circuit;
comparing the detected electrical parameter and the value of an initial electrical parameter; and
determining the subject body being damaged when the difference between the detected electrical parameter and the value of the initial electrical parameter exceeds a predetermine range.

18. The damage detecting method as claimed in claim 17, characterized in that the detecting circuit further comprises the alarm device which outputs an alerting signal when the electrical parameter detected by the detecting device exceeds a predetermined limit.

19. The damage detecting method as claimed in claim 17, characterized in that:
the detecting circuit performs a cyclic detection, during the cyclic detection, the detecting circuit detects the electrical parameter of the smart coat in a predetermined cyclic detection period.

20. The damage detecting method as claimed in claim 19, characterized in that the method further comprises steps of:
storing a detected electrical parameter during a first cyclic detection into a storage as initial electrical data;
determining the subject body being damaged when the difference between a current electrical parameter detected during a current cyclic detection and the initial electrical data exceeds a predetermined range.

21. The damage detecting method as claimed in claim 19, characterized in that the method further comprises steps of:
the detecting circuit further comprises an alarm device, when the current electrical parameter detected by the detecting device during the cyclic detection exceeds a predetermined limit, the alarm device outputs an alerting signal.

22. The damage detecting method as claimed in claim 17, characterized in that:
said subject body has two surfaces opposite to each other;
said smart coat is provided on at least one of the two surfaces.

23. The damage detecting method as claimed in claim 17, characterized in that:
said sensor is solidified to be integrated with said subject body.

* * * * *